United States Patent
Popjoy

(10) Patent No.: US 6,698,729 B2
(45) Date of Patent: Mar. 2, 2004

(54) GAS SPRING HAVING A CONTROLLABLE OUTPUT FORCE

(76) Inventor: Mark A. Popjoy, 223 Twining Rd., Lansdale, PA (US) 19446

(*) Notice: Subject to any disclaimer, the term of this patent is extended or adjusted under 35 U.S.C. 154(b) by 0 days.

(21) Appl. No.: 09/883,050

(22) Filed: Jun. 15, 2001

(65) Prior Publication Data

US 2003/0042661 A1 Mar. 6, 2003

(51) Int. Cl.[7] .................................................. F16F 9/02
(52) U.S. Cl. ..................... 267/64.28; 267/217; 267/218; 188/269
(58) Field of Search ........................... 207/64.28, 64.11, 207/64.13, 217, 218, DIG. 1, DIG. 2; 188/269

(56) References Cited

U.S. PATENT DOCUMENTS

| | | | |
|---|---|---|---|
| 3,854,710 A | 12/1974 | Nicholls | 267/64.13 |
| 3,869,861 A | 3/1975 | Case | 60/413 |
| 4,408,751 A | 10/1983 | Dodson et al. | 267/120 |
| 4,651,979 A | 3/1987 | Freitag et al. | 267/64.13 |
| 4,858,981 A | 8/1989 | Post | 296/76 |
| 4,921,225 A | 5/1990 | Ludwig | 267/64.13 |
| 5,042,782 A | 8/1991 | Mintgen | 267/64.28 |
| 5,106,065 A | 4/1992 | Staton et al. | 267/64.11 |
| 5,404,972 A | 4/1995 | Popjoy et al. | 188/277 |
| 6,241,060 B1 * | 6/2001 | Gonzalez et al. | 188/322.22 |
| 6,311,961 B1 * | 11/2001 | Julia | 267/64.17 |

FOREIGN PATENT DOCUMENTS

JP 403099923 * 4/1991 .................. 267/218

* cited by examiner

Primary Examiner—Matthew C. Graham
(74) Attorney, Agent, or Firm—Baker Botts LLP

(57) ABSTRACT

A gas spring for moving a load relative to a body includes a cylinder member having an axis, an inner surface forming a chamber, a rod end and a closed end, a piston rod seal/guide received in the rod end of the cylinder member, and a piston rod received in the seal/guide for movement into and out of the cylinder member. A floating piston is received in the cylinder member for movement along the axis and in sealed engagement with the inner wall to define in the chamber a gas section between the floating piston and the rod end and a closed end section between the floating piston and the closed end. A mass of gas under a pressure above atmospheric pressure is contained in the gas section. A powered drive is provided for moving the floating piston axially of the cylinder member to vary the volume of the gas section of the chamber. A sensing device senses a characteristic of the gas spring that is indicative of the force applied to the rod by the gas in the gas section and produces a signal indicative thereof. The signal generated by the sensing device is used to control the drive.

13 Claims, 2 Drawing Sheets

GAS SPRING HAVING A CONTROLLABLE OUTPUT FORCE

TECHNICAL FIELD OF THE INVENTION

The present invention relates generally to gas springs and, particularly, to gas springs of the type that are used primarily to lift and hold open the trunk lids, tailgates, hatchback lids, and engine compartment hoods of motor vehicles.

BACKGROUND OF THE INVENTION

Gas springs are widely used to partly or totally counterbalance the engine compartment hoods, trunk lids, rear windows and tailgates of passenger cars, station wagons, and vans to facilitate opening them and to hold them open at a nearly or fully open position. It is well-known that the force outputs of gas springs vary considerably with the temperature of the gas—at low temperatures the gas spring produces a force that can be very much lower than the force produced at high temperatures. It is necessary, therefore, to design a gas spring so that it produces a sufficient force to hold open the hood, tailgate or the like (hereinafter referred to as the "load") at a suitably selected low temperature, say, −30 degrees F. Ordinarily, gas springs are designed to provide a force of from about one to about five pounds over the load in the hold-open position of the load at the low temperature. At high temperatures, the hold-open force may increase by as much as 50 pounds, which means that the force required to move the load toward closed from the hold-open position (the "handle load") can be more than 50 pounds.

In addition to the problem of wide variations in the handle load as a function of temperature, the counterbalancing force exerted by the gas spring on the load at all positions of the load between closed and open varies widely with temperature. In cold weather, the gas spring force exerts a considerably lower counterbalancing force on the load than at high temperatures. Depending on the geometry of the gas spring/load system, the user may have to exert a relatively large force on the load during part or all of the movement of the load from closed to fully open in cold weather. In hot weather the gas spring force may move the load from closed to open without the intervention of the user under a relatively high opening force and at a relatively high speed, which can sometimes be disconcerting to an unwary user or can damage the load if there is an obstruction that prevents the load from fully opening.

Various proposals have been made for mitigating the problem of variations due to temperature changes in the hold-open/handle load with the load open. Some examples are found in U.S. Pat. No. 5,106,065 (Staton et al., 1992) and U.S. Pat. No. 5,404,972 (Popjoy et al., 1995). Those solutions are based on having one or more bypasses between the sub-chambers of the gas chamber on opposite sides of the piston, each bypass having a spring-biased valve which is closed at low temperatures and blocks the flow of gas from the closed-end sub-chamber to the rod-end sub-chamber and opens at high temperatures to permit gas to flow through the bypass. When the bypass is closed, the relatively low force of the gas spring is supplemented by the effect of the biasing force on the valve such as to increase the hold-open force. The devices of those two patents have no effect on the force output of the gas spring when the load is moved from closed to open.

It has also been suggested that a reduction in the output force of a gas spring due to leakage of gas or low temperature can be compensated for by providing a secondary gas chamber or reservoir that contains gas at a pressure higher than that in the primary chamber and a pressure-responsive valve in a passage that connects the secondary chamber to the primary chamber and opens when the pressure in the primary chamber falls below a predetermined value. Such an arrangement is proposed in U.S. Pat. No. 5,042,782 (Mitgen, 1991). When gas is supplied from the secondary chamber to the main chamber to make up for a pressure drop in the main chamber due to a decrease in temperature, the output force is prevented from being reduced by the addition of air to the main chamber from the secondary chamber. When the force output of the gas spring rises due to an increase in temperature, gas can, if desired, be released from the main chamber through a vent (FIG. 4), thereby preventing the gas spring force from increasing to an undesirable level. The arrangement of the Mintgen patent maintains a relatively uniform force output of the gas spring over a wide range of temperatures but inherently requires releasing gas from the system, lest complete hot-cold-hot cycles of operation cause the operating force to become excessive on the next cold-hot phase of another cycle. Unless a wide difference is built into the respective valves for the replenishment of gas and release of gas, frequent venting of gas will soon deplete the gas in the secondary chamber, thus requiring recharging. The need for frequent service of the system is a disadvantage.

SUMMARY OF THE INVENTION

An object of the present invention is to provide a gas spring that provides a controllable force output over a long useful life without the need for any service, such as replenishing a gas in a supplemental supply reservoir. Another object is to provide a gas spring that is capable of exerting forces that vary in a predetermined manner during each stroke of an operating cycle. Yet another object is to provide a gas spring that provides a force output that does not vary with temperature changes.

The objects referred to above are attained, in accordance with the present invention, by a gas spring for moving a load relative to a body that includes a cylinder member having an axis, an inner surface forming a chamber, a rod end and a closed end, a piston rod seal/guide received in the rod end of the cylinder member, and a piston rod received in the seal/guide for movement into and out of the cylinder member. A floating piston is received in the cylinder member for movement along the axis and in sealed engagement with the inner wall to define in the chamber a gas section between the floating piston and the rod end and a closed end section between the floating piston and the closed end. A mass of gas under a pressure above atmospheric pressure is contained in the gas section. A powered drive is provided for moving the floating piston axially of the cylinder member to vary the volume of the gas section of the chamber. A sensing device senses a characteristic of the gas spring that is indicative of the force applied to the rod by the gas in the gas section and produces a signal indicative thereof. The signal generated by the sensing device is used to control the drive.

A gas spring, according to the present invention, provides a predetermined force output by variation of the volume of the gas section. For example, if the temperature of the gas in the gas section drops but the volume of the gas section remains constant, the pressure of the gas and the force output of the gas spring are reduced correspondingly. The reduction in pressure is detected by the sensor. The controller responds to the change in the sensor signal by activating the power drive, which displaces the floating piston in a direction to reduce the volume of the gas section, thereby raising the pressure of the gas and the output force. The present invention makes it possible for the gas spring to provide an output force that remains substantially constant for any given stroke position, regardless of variations in temperature over a very wide range.

In a simple system the controller and drive may be activated periodically when the load is closed. The controller and drive are powered by the battery of the vehicle. Periodic activation saves battery power. A low-battery shut-off can be incorporated to prevent the battery from being drained. If the sensor detects a change in the gas pressure, the drive is activated to change the volume of the gas section and restore the pressure to the predetermined level. Therefore, when a user opens the load, the gas spring has been previously adjusted to provide the desired output force to counterbalance the load, maintain the load in the open position, and yield to a predetermined handle load in the closing direction.

In one form of system, the drive is deactivated when the load is moved from closed—e.g., by responding to an existing lamp switch. After opening is initiated, the gas spring functions in the same way as a conventional gas spring without intervention of the drive.

As the rod of a gas spring extends, the volume of the part of the rod that was previously within the gas chamber becomes part of the volume occupied by the gas. As is well-known, of course, that phenomenon reduces the output force as a function of rod extension. It may be desirable, therefore, to have the drive activated only during the opening stroke or when the load is open so that a predetermined force is established at the open position of the load.

Opening of the load may also initiate a phase of operation of the system in which the floating piston is moved in response to a computer program stored in the controller that provides predetermined variations in the gas spring force by driving the floating piston in response to signals generated under the control of the computer program. For example, the program may provide for automatic opening of the load without the intervention of the user, an idle or dwell state when the load is fully opened or opened to a desired degree, maintenance of a predetermined hold-open force, and response to a predetermined handle load that initiates automatic closing of the load. Ancillary to computer control of the gas spring at the beginning of an opening stroke is the possibility of providing a relatively high output force at the beginning of the opening stroke, when the mechanical advantage of the gas spring relative to the load is usually low due to the geometry of the gas spring relative to the load, followed by a reduction in force at the end of the opening stroke. The sensor signal provides feedback for servo-control of the drive device to match the function of the gas spring to the program.

The drive device for moving the floating piston may include a mass of oil in the closed section of chamber, a pump for selectively adding oil to the closed section, an oil sump serving the oil pump, a power source for energizing the pump, and conduits and a controllable valve interposed between the closed section of the chamber and the pump and the sump. With such a hydraulic drive, the characteristic indicative of the gas pressure sensed by the sensing means is, preferably, the pressure of the oil in the closed section of the chamber. Advantageously, an emergency valve can be interposed between the closed section and the oil delivery/return conduit and adapted to close in response to a flow of oil from the closed section to the conduit at a rate exceeding a predetermined rate. Such an arrangement prevents the load from closing abruptly in the event that there is a failure in the hydraulic system.

In other embodiments, the device for moving the floating piston includes an electric motor and a transmission, such as a ball-screw drive, coupled between the motor and the floating piston. In such embodiments, the characteristic sensed by the sensor may be the pressure of the gas in the gas section of the chamber. The sensor is located in the floating piston and the pressure signal is taken out of the cylinder through a conductor located within the closed section of the cylinder chamber and passing through the end closure unit.

DESCRIPTION OF THE DRAWINGS

For a more complete understanding of the present invention, and the advantages thereof, reference may be made to the following description of exemplary embodiments, taken in conjunction with the accompanying drawings, in which.

DESCRIPTION OF THE EMBODIMENTS

Figure 1:
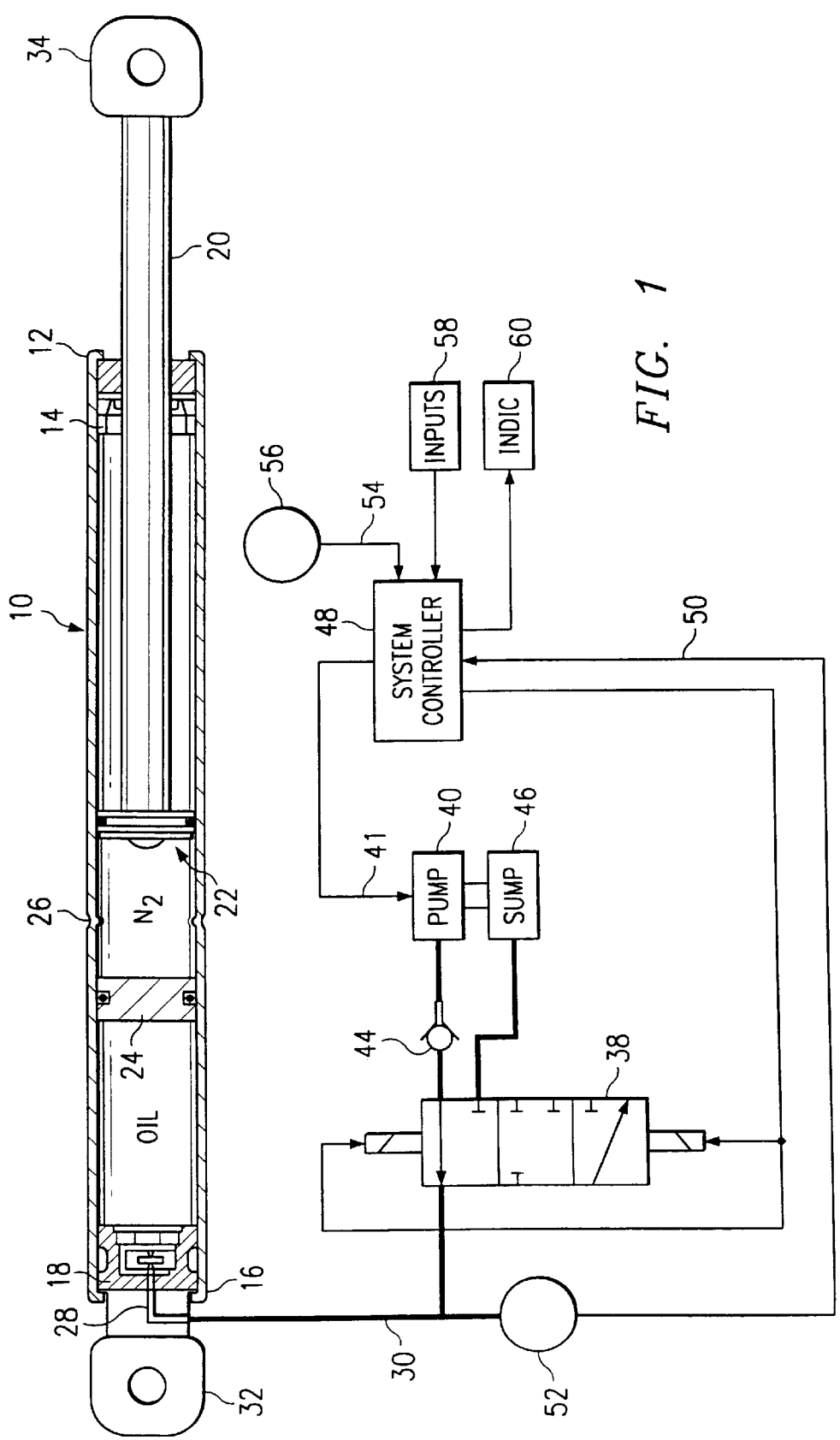
FIG. 1 is a schematic side cross-sectional view of a first embodiment of a gas spring and a diagram of drive and control components.

A gas spring, according to the first embodiment, has a cylinder member 10, one end of which—the rod end 12—receives a rod guide/seal assembly 14 and the other end of which—the closed end 16—receives a closure unit 18. A piston rod 20 is received through the guide/seal assembly 14 in sealed relation for sliding movement between a retracted position in which most of the rod is received within the cylinder member and an extended position in which most of the rod extends out of the cylinder member. A piston assembly 22, which may be of any conventional design, such as a type having dynamic damping, is affixed to the end of the rod within the cylinder member. The dynamic damping feature of the piston, if provided, restricts fluid flow past the piston assembly so as to slow the movements of the piston rod 20 when it extends and retracts.

A floating piston 24 slides in sealed relation along a portion of the cylinder member 10 between the closure unit 18 and a stop groove 26 formed in the wall of the cylinder member 10. The floating piston 24 divides the chamber within the cylinder member into a gas section N2, which contains a gas (e.g., nitrogen) under pressure, and a closed end section OIL, which contains oil. The gas section may also contain a quantity of oil for lubrication of the piston rod and enhancement of the sealing of the piston rod 20 to the guide/seal assembly 14. The amount of oil in the section OIL varies and is controlled by pumping oil into it or releasing oil from it through a passage 28 in the closure unit 18 and a conduit 30.

As is well-known, per se, the closed end 16 of the cylinder member 10 has a fitting 32 that is attached to a vehicle body (not shown), and the piston rod 20 receives a fitting 34 that is attached to a truck lid, tail gate or the like (the load, also not shown). When the load is released, the pressure of the gas in the gas section N2 acts on the piston rod 20 over the cross-sectional area within the guide/seal assembly 14 and applies a force to the piston rod in a direction to extend it. The force partly or wholly offsets the force of the load and assists in raising the load from closed to open. Ordinarily, the gas spring is designed to provide a hold-open force that holds the load in the open position until the user applies a handle load to move the load back to the closed position. As discussed above, changes in the temperature of the gas in the gas section N2 cause large variations in the hold-open load.

A three-way solenoid valve 38 is interposed in the conduit 30 and provides for (1) connecting the conduit 30 to a pump 40 through a conduit 42 having a check valve 44, (2) closing the conduit 30 from receiving or discharging oil—thus trapping oil in the closed end section OIL—and (3) connecting the conduit 30 to a conduit 45 that leads to a sump 46, which serves the pump 40. A system controller 48 controls the pump 40 through a conductor 41 and the solenoid valve 38 in response to input signals that include a signal supplied through a conductor 50 from a pressure switch or pressure transducer 52, which is connected to the conduit 30, and a signal supplied through a conductor 54 from a load position sensor 56, which may be a lamp switch associated with the load (i.e., the trunk lid, tailgate, or the like) or a dedicated switch that cycles when the load is opened or closed. Other inputs to the controller, as indicated diagrammatically by the box "INPUTS" 58, include a signal indicative of whether the vehicle ignition is on or off and a signal indicative of a low battery charge. The controller may include indicators, as shown diagrammatically by the box "INDIC." 60, such as a "low battery" lamp, a "control system fault lamp" and a "low pressure" lamp, the latter indicating that the gas spring pressure is below the desired level even though the control system is functioning properly and that the gas spring requires service.

Various modes of control of the gas spring are possible. In one example, the gas in the gas spring is maintained at a generally constant pressure at all times when the load is closed, provided that the battery is not drawn down, as indicated by the low battery input. When the ignition is off, and as long as the battery is not low, the controller 48 periodically accepts a signal from the pressure switch 52 and if the pressure is below the desired level energizes the pump 40 and cycles the valve 38 so as to pump oil into the closed end section OIL of the gas spring through the conduit 30. (Obviously, the pressure of the oil in the oil section is a function of the gas pressure in the gas section N2 and of the force exerted by the gas spring.) When the desired pressure is attained, the controller receives a signal from the pressure switch 52 and shuts off the pump and cycles the valve 38 to closed, thus locking in the oil pressure in the section OIL. If the pressure switch 52 detects that the oil pressure is above the desired level, the valve is cycled to open the conduit 30 to the conduit 45 and the sump 46, thus releasing oil from the section OIL and reducing the pressure in the gas spring. When the pressure drops to the desired level, the valve is cycled to closed. The operation of the system when the ignition is on may be the same as when the ignition is off, or the operation may be modified by enabling either more frequent monitoring or constant monitoring of the pressure in the gas spring and thus more frequent or constant maintenance of the desired gas spring force.

When the load is opened, the gas spring operates in the same manner as a conventional gas spring. Generally, it is undesirable with the operating modes described above to allow the oil supply system to operate when the load is not closed, inasmuch as the operation of the pump that will occur when the rod moves out, thus inherently reducing the gas pressure as the part of volume of the gas section occupied by the rod is reduced, will increase the gas pressure for only as long as the load is open. When the load is closed, the system will simply dump oil back to the sump. Therefore, a signal from the gate position sensor 56, indicating that the load is open, deactivates the system, which remains off at all times when the load is open.

For providing another mode of operation of the embodiment of FIG. 1, the controller 48 includes a computer, which is programmed to control the pump and valve in a manner that varies the spring force beginning when the load is opened and ending when the load is closed. That mode also uses a pressure transducer 52—instead of a pressure switch—which supplies signals to the controller that are indicative of the output force of the gas spring. When the load is closed, the system operates in the manner described above, thus maintaining the gas spring force at a set value in readiness for an opening/closing cycle. In many installations, the force required to move the load from fully closed at the beginning of an opening stroke of the load is relatively high, as compared to the hold-open force, due to a low mechanical advantage of a function of the angle between the axis of the gas spring and a line connecting the pivot axis of the load and the point where the gas spring is connected to the load. If it is desired to provide automatic opening, the controller is programmed to maintain the gas spring with a relatively high force with the load closed. When the load is unlatched and moved toward open, the high force of the gas spring moves the load toward open without intervention of the user. The program may then maintain the pump 40 inactive and the valve 38 closed until the pressure transducer indicates to the controller that the load is fully opened—i.e., the pressure transducer indicates that the spring force has attained a certain level. The fully open condition can also be signaled by a position switch or an inclination detector.

When the system detects the open position, the controller responds by cycling the valve to open the conduit 30 to the sump 46, whereupon the hold-open load is reduced, if necessary or desired, to a predetermined level. At that point, which is signaled by feedback from the pressure transducer 52, the valve 38 is cycled to closed, thus locking in the hold-open force. When the user applies a handle force to the load, the increased pressure is sensed by the pressure transducer, which signals the controller to open the valve 38 to the sump. The reduced spring force allows the load to move to the closed position by the force of gravity. Latching may occur by inertia or may be carried out by an automatic latch.

Fully automatic opening and closing, preferably under the command of a dashboard switch or a hand-held remote control device (not shown), can be incorporated into the controller 48. The user commands an opening stroke, which releases a latch to allow the load to open. If needed, such as when the load is over center with respect to the axis of the gas spring, an opening mechanism for moving the load to a position at which the gas spring takes over can be included. The oil control system can remain idle until the user commands a closing stroke, thus cycling the valve 38 to open the oil conduit 30 to the sump 46.

When the oil supply and control system are set up for either semi-automatic or fully automatic opening and closing, attaining of the closed position initiates a phase of operation in which the gas spring force is restored to the programmed level for the next cycle, by pumping oil back into the closed section OIL to make the gas spring ready for the next cycle and maintain it in that state. If a user wants to open the load before the system has been restored to the "ready" state, the load can be opened manually, albeit that the user has to apply a lifting force to supplement the reduced force of the gas spring. The gas spring, however, retains a residual force to aid in manual opening of the load.

In order to avoid an unintended abrupt closing of the load in the event of a failure of the oil supply system that results in abrupt loss of oil pressure, the closure unit 18 may include an emergency shut-off valve, which responds to a high oil flow rate from the oil section to the conduit 30 by closing and remaining closed until the load is removed from the gas spring, such as by raising the load slightly, thus eliminating the differential pressure across the emergency shut-off valve. In this manner the load can then be lowered safely in a series of controlled steps.

A computer program can be designed to permit the user to set the position of the load at less than fully open. In a "set open position" of the program, which is initiated by an input to the computer of the controller 48, the user can "jog" the load to the desired position by manipulation of the load up or down. When the load holds a desired position briefly in a "hands off" state, the user enters a "set position" command, which sets the program to look for a force output indicated by the pressure signal from the transducer 52 after initiation of an opening stroke and lock in that force by cycling the valve 38 to closed and lock in that force when the transducer signals that the force that holds the load at the set position has been established.

A similar user-set open position can be established by incorporating an inclination detector into the load and providing a way for the user to input a desired degree of opening to the computer. The input will establish a value of inclination at which the force to hold the load at the desired position will be locked into the gas spring when the inclination detector provides feedback to the controller indicating that the position has been attained. The program will be designed to modulate the rate of supply or release of oil to or from the oil section OIL of the gas spring as a function of rate of change in inclination. To that end, the oil supply system will have a four-position valve that has a controllable position in which oil is pumped both to the section OIL of the gas spring and to the sump 46 simultaneously in controlled proportions. The capability of the system of opening the load to a desired open position that is less than fully open is highly advantageous with large tailgates, which in the fully open position can strike overhead garage doors or the low ceilings or beams often found in parking garages.

Figure 2:
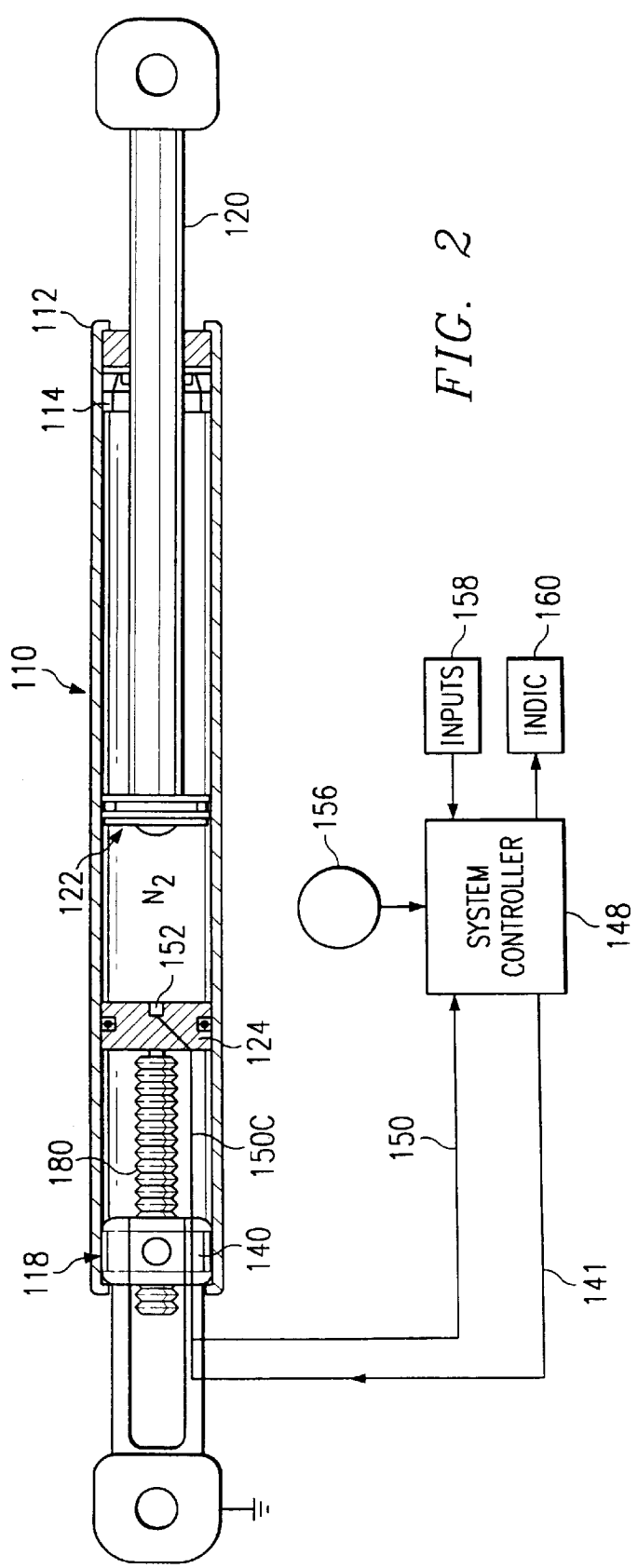
FIG. 2 is a schematic side cross-sectional view of a second embodiment and a diagram of drive and control components.

The embodiment of FIG. 2 is similar in many respects to that of FIG. 1. The same reference numerals that are applied to FIG. 1, but increased by 100, are used in FIG. 2 to designate corresponding parts. The foregoing description of the embodiment of FIG. 1 is applicable to the embodiment of FIG. 2, except as follows.

The main difference between the embodiment of FIG. 1 and the embodiment of FIG. 2 is that in the embodiment of FIG. 2 the hydraulic drive for moving the floating piston is replaced by an electric motor 140, which may be built into the closure unit 118 (as shown) or may be attached externally of the closure unit to the cylinder 110. The motor 140 drives a ball-screw drive, only the lead screw 180 of which is shown in the drawing, that is coupled to and drives the floating piston 124. The pressure switch or transducer 152 is built into the floating piston 124, and the conductor 150 leads from the transducer 152 to the system controller 148 through a helically coiled part 150c (coil not illustrated) within the closed section 182 between the piston 124 and the closure unit 118. A speed reducer may likely be incorporated into the drive.

The system controller 148 is set up to energize the motor through a conductor cable 141 to drive the lead screw 180 and move the piston 124 toward or away from the rod end 12 and thus reduce or increase the volume of the gas section N2 of the cylinder member 110. All of the modes of operation of the controller 148 and the motor 140 described above in respect of the controller 48, pump 40 and valve 38 are possible in the embodiment of FIG. 2. Therefore, the foregoing description need not be and is not repeated here.

What is claimed is:

1. A gas spring for moving a load relative to a body between a closed position of the load relative to the body, corresponding to a retracted position of the gas spring, and an open position of the load relative to the body, corresponding to an extended position of the gas spring, comprising:

a cylinder member having an axis, an inner surface forming a chamber, a rod end and a closed end;

a piston rod seal/guide received in the rod end of the cylinder member;

a piston rod received in the seal/guide for movement into and out of the cylinder member between said retracted and extended positions of the gas spring;

a floating piston received in the cylinder member for movement along the axis and in sealed engagement with the inner surface to define in the chamber a gas section between the floating piston and the rod end and a closed end section between the floating piston and the closed end;

a piston assembly mounted on the axially inner end of the piston rod within the gas section;

a mass of gas under a pressure above atmospheric pressure contained in the gas section on both axial sides of the piston assembly;

means for moving the floating piston axially of the cylinder member to vary the pressure of the gas in the gas section;

means for sensing a characteristic of the gas spring indicative of the force applied to the rod by the gas in the gas section and producing a signal indicative thereof; and means for controlling the means for moving the floating piston in response to the signal, at least in the retracted position of the gas spring, so as to vary the volume of the gas section of the cylinder member such that the force exerted on the piston rod by the gas is maintained at a substantially constant predetermined level at the closed position of the load sufficient to move the load away from the closed position.

2. A gas spring according to claim 1 wherein the means for moving the floating piston includes a mass of oil in the closed end section of chamber, and means for selectively adding oil to and removing oil from the closed end section.

3. A gas spring according to claim 2 wherein the characteristic sensed by the sensing means is the pressure of the oil in the closed end section of the chamber.

4. A gas spring according to claim 1 wherein the means for moving the floating piston includes a mass of oil in the closed end section of chamber, an oil pump, and an oil sump serving the oil pump, and wherein the controlling means controls the operation of the oil pump and a controllable valve interposed between the closed end section of the chamber and the oil pump and the sump.

5. A gas spring according to claim 4 wherein the characteristic sensed by the sensing means is the pressure of the oil in the closed end section of the chamber.

6. A gas spring according to claim 2 wherein there is an oil delivery/return conduit connected to the closed end section and further comprising an emergency valve interposed between the closed end section and the oil delivery/ return conduit and adapted to close in response to a flow of oil from the closed end section to the conduit at a rate exceeding a predetermined rate.

7. A gas spring according to claim 1 wherein the means for moving the floating piston includes a motor and a transmission coupled between the motor and the floating piston.

8. A gas spring according to claim 7 wherein the characteristic sensed by the sensing means is the pressure of the gas in the gas section of the chamber.

9. A gas spring according to claim 1 wherein the controlling means controls the moving means only when the load is in the closed position and is deactivated when the gas spring moves the load from the closed position.

10. A gas spring according to claim 1 wherein the controlling means controls the moving means so as to maintain a substantially constant gas pressure force on the rod when the load is in the closed position and to automatically vary the force exerted by the piston rod to correspond to a programmed force profile initiated when the load is moved from the closed position.

11. A gas spring according to claim 10 wherein the controlling means is settable by a user such that the load is moved to and held at a partially open position by the moving means.

12. A gas spring for moving a load relative to a body, comprising a cylinder member having an axis, an inner surface forming a chamber, a rod end and a closed end;

a piston rod seal/guide received in the rod end of the cylinder member;

a piston rod received in the seal/guide for movement into and out of the cylinder member;

a floating piston received in the cylinder member for movement along the axis and in sealed engagement with the inner surface to define in the chamber a gas section between the floating piston and the rod end and a closed end section between the floating piston and the closed end;

a mass of gas under a pressure above atmospheric pressure contained in the gas section;

means, including a motor and a ball/screw drive driven by the motor and having a lead screw connected to the floating piston, for moving the floating piston axially of the cylinder member to vary the pressure of the gas in the gas section;

means for sensing a characteristic of the gas spring indicative of the force applied to the rod by the gas in the gas section and producing a signal indicative thereof; and means for controlling the means for moving the floating piston in response to the signal.

13. A gas spring according to claim 12 wherein the characteristic sensed by the sensing means is the pressure of the gas in the gas section of the chamber.

* * * * *